United States Patent [19]

Morell, III

[11] Patent Number: 5,418,403
[45] Date of Patent: May 23, 1995

[54] SYSTEM FOR CONVENIENTLY PROVIDING LOAD TESTING TERMINATION OF AN AC POWER SOURCE HAVING AT LEAST ONE BATTERY

[75] Inventor: Wilbert J. Morell, III, Hatfield, Pa.

[73] Assignee: The United States of America as represented by the Secretary of the Navy, Washington, D.C.

[21] Appl. No.: 331,231

[22] Filed: Oct. 3, 1994

Related U.S. Application Data

[63] Continuation of Ser. No. 972,701, Nov. 5, 1992, abandoned.

[51] Int. Cl.$^6$ .............................................. H02J 9/00
[52] U.S. Cl. .............................. 307/72; 307/26; 307/64; 307/80
[58] Field of Search .................. 307/18, 22, 72, 23, 307/26, 46, 48, 64–66, 70, 80, 85–87; 324/111, 120; 363/34, 36, 37, 142

[56] References Cited

U.S. PATENT DOCUMENTS

| | | | |
|---|---|---|---|
| 3,666,961 | 5/1972 | Bogue et al. | 307/65 |
| 4,879,624 | 11/1989 | Jones et al. | 307/64 |
| 5,087,872 | 2/1992 | Gupta | 307/82 |
| 5,126,585 | 6/1992 | Boys | 307/66 |
| 5,182,464 | 1/1993 | Wordworth et al. | 307/87 |
| 5,182,518 | 1/1993 | Stich et al. | 307/66 |
| 5,218,283 | 6/1993 | Wills et al. | 363/98 |

Primary Examiner—Brian K. Young
Assistant Examiner—Richard T. Elms
Attorney, Agent, or Firm—James V. Tura; Susan E. Verona

[57] ABSTRACT

An AC uninterruptible power source is disclosed that provides multi-phase power output signals for actual use and a selectable single phase power output signal for use in testing. The AC uninterruptible power source further comprises at least one battery. The single phase output signal is connected to a dummy load by means of a power switch of the break-before-make type. The invention further includes the dummy load as preferably having metering capabilities to measure the frequency, current, and voltage parameters of the single phase output signal. The arrangement of the present invention allows for the single phase output to be mated to the dummy load without the need of removing input power to the AC uninterruptible power source so as to reduce, or even eliminate, transient caused failures to the AC uninterruptible power source and to its sensitive load equipment which the power source services.

11 Claims, 3 Drawing Sheets

SYSTEM FOR CONVENIENTLY PROVIDING LOAD TESTING TERMINATION OF AN AC POWER SOURCE HAVING AT LEAST ONE BATTERY

STATEMENT OF GOVERNMENT INTEREST

This invention described herein may be manufactured and used by or for the Government of the United States of America for governmental purposes without the payment of any royalties thereon or therefor.

This is a continuation of application Ser. No. 07/972,701 filed on Nov. 5, 1992, now abandoned.

BACKGROUND OF THE INVENTION

The present invention relates to a system for conveniently providing load testing termination for an AC power source, e.g., generators or a static converters, having at least one battery and, more particularly, to a dummy load arrangement that is switchably connected to a selectable power signal generated for testing purposes by an AC uninterruptible power source system that includes a plurality of batteries.

AC power source finding application on large vessels or other large independently operated transport devices commonly include batteries that serve as secondary energy store devices and are commonly only used in the event of a failure in the primary AC power source. AC power sources, in these applications typically provide power excitation signals that are in the kilovolt-ampere (KVA) range and having a frequency of 60 $H_z$ or 400 $H_z$ while being configured in a three phase delta or wye arrangement. The AC power source commonly provides excitation to loads comprising equipment whose operation is of a critical nature and should not be disturbed by any power interruption of the AC power source itself. To accommodate such critical equipment, the primary AC power sources are arranged with batteries serving as a back-up excitation source, so as to provide for commonly termed uninterruptible power source (UPS) systems.

The batteries in these UPS systems are commonly connected to battery chargers, either internal or external to the UPS system, that include a d.c. power supply which is used to charge the batteries in the standby mode of the UPS system. These batteries, along with the UPS system itself, are commonly tested during routine maintenance. During such maintenance, input power to the UPS system is removed and the UPS system is disconnected from its critical equipment. An alternate AC power source is then connected to the critical load until the UPS system is tested. The UPS system is then connected to the appropriate test equipment. If the batteries are found to be defective, or if the AC generating equipment is found to be defective, the UPS system is out of service and must be disconnected from its critical load that desires uninterrupted power.

Even if the batteries and the UPS AC power sources are not defective, the time required for such testing is relatively long due to the inconvenience of disconnecting and reconnecting relatively large power cables carrying the relatively heavy currents. Furthermore, damage may occur to the UPS system because of the heavy input current surges that are typically created when the input power is re-applied to the UPS system. These surges may very well damage semiconductor devices within the UPS system. It is desired that means be provided that allow for the UPS system, including its batteries, to be more conveniently tested and without the need of removing and reapplying input power to the UPS system.

SUMMARY OF THE INVENTION

The present invention is directed to the AC uninterruptible power source (UPS) system having internal means to provide a representative test signal and a switching arrangement that interconnects the representative test signal to a dummy load.

The system of the present invention comprises at least one uninterruptible power source, a dummy load, and a switching arrangement. At least one AC uninterruptible power source has at least one battery and has means for generating selectable single phase and multi-phase power output signals. The switching arrangement interconnects the dummy load to the selectable single phase power output signal.

Accordingly, it is an object of the present invention to provide an uninterruptible power source having means to generate a test signal indicative of its operating condition. The present invention further provides a dummy load for terminating the test signal, and a switching arrangement for conveniently interconnecting the dummy test load to the selectable test signal without causing any unnecessary disturbance to the critical equipment serving as the actual load of the uninterruptible source, this is accomplished by transferring the critical load to a backup AC power source via a manual bus transfer switch.

It is a further object of the present invention to provide a variable dummy load having metering and cooling capabilities so that all of the parameters of the representative test signal may be measured.

Still further, is an object of the present invention to provide for a switching arrangement that handles a substantial amount of current and that does not cause any unnecessary interruption to the critical equipment.

Other objects, advantages and novel features of the invention will become apparent from the following detailed description when considered in conjunction with the accompanying drawings therein:

DETAILED DESCRIPTION

Figure 1:
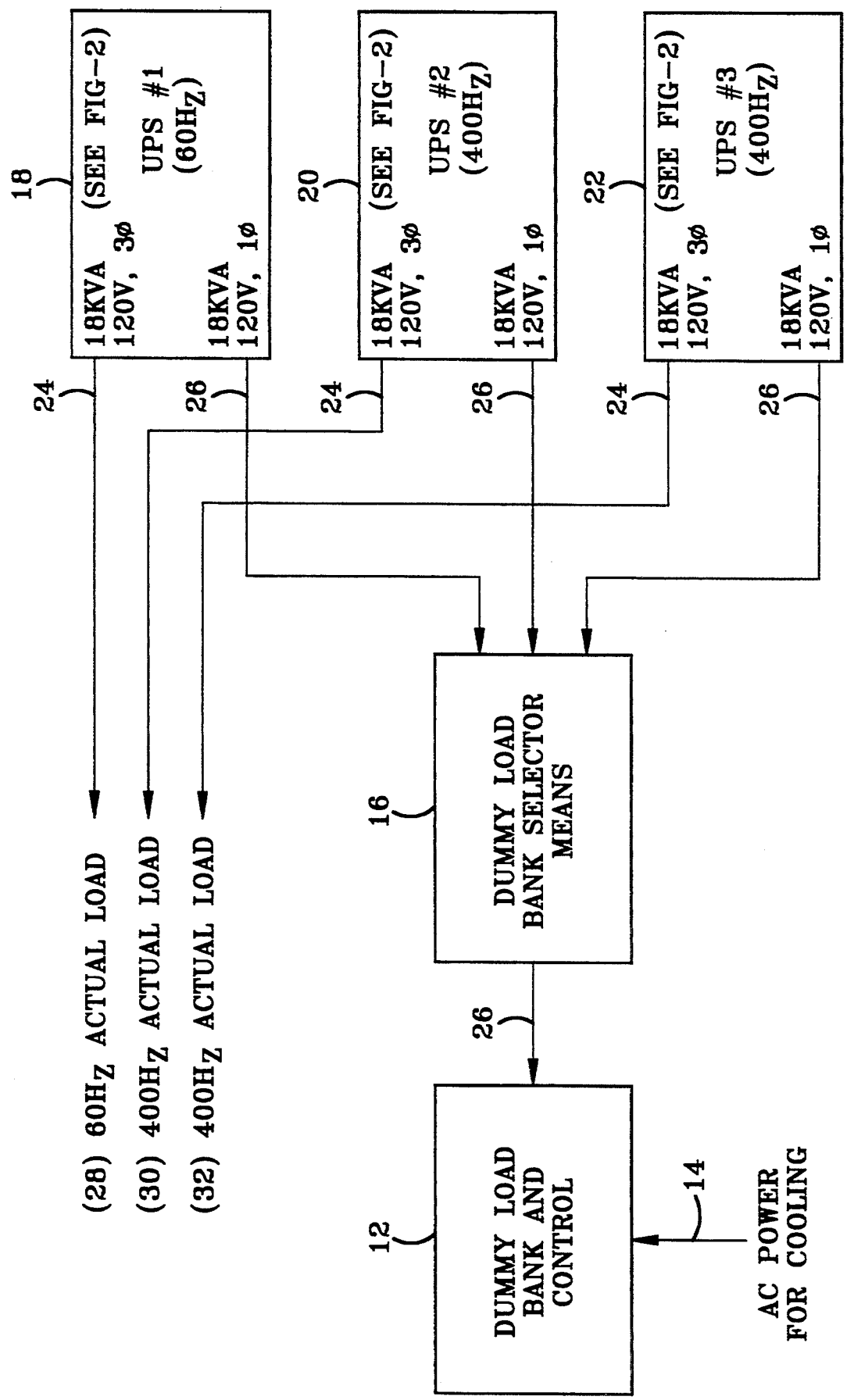
FIG. 1 is a block diagram showing the primary elements related to the present invention.

With reference to the drawings wherein the same reference numbers are used to indicate the same elements, FIG. 1 illustrates a block diagram of the system of the present invention which comprises a dummy load bank and control 12 to which is applied an AC power 14 for cooling purposes, a dummy load bank selector means 16, and three UPS #1, #2, and #3 systems respectively indicated with reference numbers 18, 20 and 22. For the embodiments shown in FIG. 1, UPS #1 generates power excitation signals 24 and 26 of a 60 $H_z$ frequency, UPS #2 generates excitation signals 24 and 26 of a 400 $H_z$ frequency, and UPS #3 also generates power excitation signals 24 and 26 of a 400 $H_z$ frequency. The power excitation signal 24 of UPS #1 is hard wired to a 60 $H_z$ actual load 28 comprising critical equipment, the power excitation signal 24 of the UPS #2 is hard wired to a 400 $H_z$ actual load also comprising critical equipment, and the excitation power signal 24 of UPS #3 is hard wired to a 400 $H_z$ actual load 32 further comprising critical equipment.

Although the signals 24 are shown by a single line, in actuality, and as to be further described, these signals are of the three-phase type requiring multiple conductors for their transmission. Similarly, signals 26 are of the single-phase type requiring multiple conductors. All of the signals 26 of UPS #1, #2 and #3 are hard wired to the dummy load bank selector means 16. The UPS #1, #2, and #3 systems may be further described with reference to FIG. 2.

Figure 2:
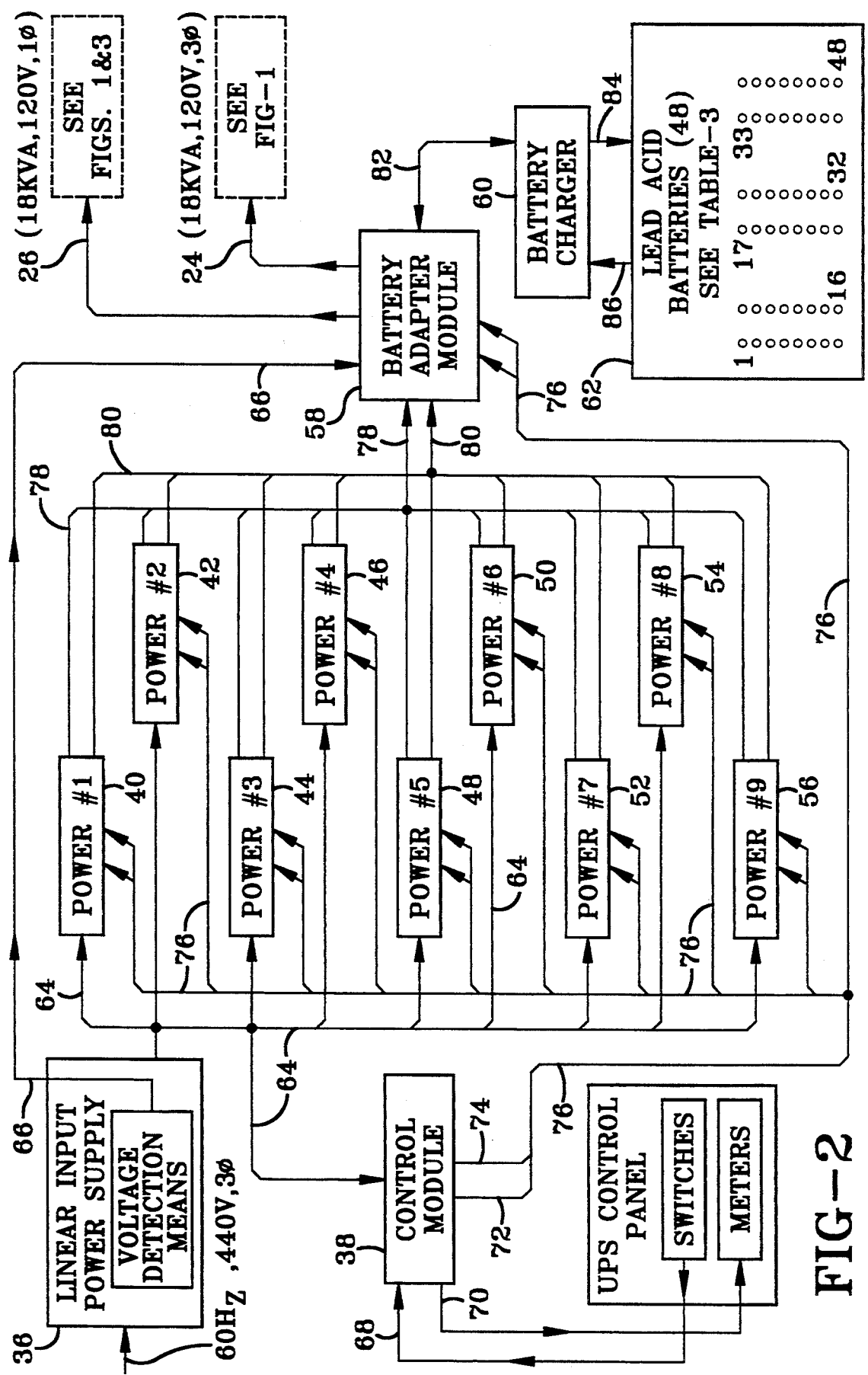
FIG. 2 is a block diagram illustrating further details of the uninterruptible power source (UPS) system shown in FIG. 1.

FIG. 2 is a schematic diagram of an arrangement of functional elements that are the same for each of the UPS #1 (18), UPS #2 (20), and UPS #3 (22) systems. The arrangement comprises a plurality of functional elements each having a reference number and all of which are shown below in Table 1:

TABLE 1

| UNINTERRUPTIBLE POWER SOURCE (UPS) SYSTEM 34 | |
|---|---|
| REFERENCE # | FUNCTIONAL ELEMENTS |
| 36 | LINEAR INPUT POWER SUPPLY |
| 38 | CONTROL MODULE |
| 40 | POWER MODULE #1 |
| 42 | POWER MODULE #2 |
| 44 | POWER MODULE #3 |
| 46 | POWER MODULE #4 |
| 48 | POWER MODULE #5 |
| 50 | POWER MODULE #6 |
| 52 | POWER MODULE #7 |
| 54 | POWER MODULE #8 |
| 56 | POWER MODULE #9 |
| 58 | BATTERY ADAPTER MODULE |
| 60 | BATTERY CHARGER |
| 62 | BATTERIES |

The UPS system operates in a conventional manner, except for the feature of the present invention of providing the power signal 26 in response to an operator's intervention, by the selection of appropriate commands at the operating panel of the UPS system.

The UPS system is comprised of a first section which is a solid state AC-AC power source converter and a second section which is a battery support system. The AC-AC power source converter comprises functional elements 36, 38, 40, 42, 44, 46, 48, 50, 52, 54, 56 and 58, and the battery support system comprises elements 60 and 62.

The AC-AC power source converter is of modular design and receives the main source excitation of 60 Hz, 440 volts three phase delta type power that is applied to linear input power supply 36. The AC-AC power converter generates selectable power signals 24 and 26, previously discussed, which are regulated, filtered and signal conditioned. The selectable signals 24 and 26 have the parameters and frequencies shown below in Table 2, and the three phase signal 24 has the output winding type connection (delta (Δ) or wye (Y) see FIG. 3) also shown in Table 2.

TABLE 2

| AC—AC POWER SOURCE CONVERTER SELECTABLE OUTPUTS | | |
|---|---|---|
| POWER SIGNAL | PARAMETERS | FREQUENCY/ TYPE CONNECTION |
| 24 | 18 kva 120 v 3-PHASE | 60 $H_z$ DELTA 60 $H_z$ WYE 400 $H_z$ DELTA 400 $H_z$ WYE |
| 26 | 18 KVA 120 V 1-PHASE | 60 $H_z$ 400 $H_z$ |

The linear input power supply 36 receives the main source power and steps it down by way of step-down transformers, rectifies the AC voltage by way of full wave bridge rectifiers, and then filters the voltage to provide a d.c. output onto bus 64 which is routed to the other modules of FIG. 2 and may serve as a d.c. source of excitation for the components of these modules. The linear input power supply has sensor means located at its input stage for detecting the voltage level of its applied AC voltage, to be described, and provides an output that is routed to the battery adapter module 58 by way of circuit path 66.

The control module 38 provides all of the control functions associated with the output of the UPS system shown in FIG. 2.

The control module 38 responds to the commands made by an operator at the control panel (not shown) of the UPS system. For example, and as is to be further described hereinafter, when an operator decides that UPS system should generate the single phase power signal 26 used for testing purposes instead of the three phase power signal 24 applied to the actual load, the operator need only make the appropriate switch command and the control module 38 will respond to such a command by supplying the necessary analog and control signals to have the circuit arrangement of FIG. 2 generate the testing signal 26 instead of its normal three phase power output signal 24. The control module 38 accepts the input signals 68 initiated at the control panel of the UPS system. The control module 38 in response to signals 68 provides output signals 70 which may be displayed on the control panel of the UPS system for indication purposes, such as metering. The control module 38 provides analog signals 72 and control signals 74 that are applied by bus 76 to the other modules of FIG. 2, as shown. The signal 72 may be developed by an oscillator and provide the means for selecting and adjusting the frequency and voltage of the output signals of the UPS system. The control signals 74 allow the external meters to monitor the output signals of the UPS system and also to control various other functions such as the opening or closing of an output contactor which is in the output stage of the UPS system and switches relatively high levels of output current.

The power modules 40, 42, 44, 46, 48, 50, 52, 54, 56 are arranged in a parallel configuration and are interchangeable. The modules are preferably adapted to be easily removed for maintenance without affecting the system's output. Each of the power modules is a 2 KVA power amplifier whose output stage is directly coupled to the input stage of the receiving device, so as to provide fast transient response and desired regulation. Each of these modules also has instantaneous current limiting means to protect the module. Still further, these modules have fail/save features which allows the output stage of each module to be shorted without causing any loss of the output voltage thereof. The output stage of each of a power modules are connected together so as to provide an accumulated power of 18 KVA, 120 V at the selectable single or three phase signal 26 or 24 that is routed to the battery adapter module 58. Each of the power modules are responsive to the control signal 74 of control module 38 which, in turn, is responsive to the operator initiated request 68 applied to the control module 38. The operator initiated requests cause the power modules to generate either the selectable signals 26 or the normally generated power signals 24.

The battery adapter module 58 interfaces the AC-AC power source converter with the battery support system. The battery adapter module comprises power electronic devices that monitor the secondary of the input power step-down transformers of the linear input power supply 36 by way of circuit path 66. This monitoring is typically provided by silicon control rectifiers (SCR) devices that provide for fast power switching between the AC-AC power source converter and the battery support system. The battery adapter module, in cooperation with the previously discussed sensor in the linear output power supply 36, detects the level of the AC voltage at the input to power supply 36 and generates a transfer signal when the voltage level at the secondary transformers goes below a predetermined value. The transfer signal causes the SCRs to turn on as soon as the voltage drops below this predetermined value and, conversely, when the voltage level present at the secondary, returned to its normal condition, the SCRs are turned off by the absence of the transfer signal. When the SCRs are rendered operative, that is, turned on, the battery support system provides the output voltages of the UPS system and conversely, when the SCRs are rendered inoperative (turned off) the power modules #1-#9 provide the output from the UPS system. The operation of SCRs is similar to a logic OR function. More particularly, the battery adapter module allows the output power signals of the UPS system to be supplied by power modules #1-#9 if the input power to the linear input power supply is at a normal condition; OR; the battery adapter module 58 allows the battery support system to provide the output of the UPS system of the input power to the linear input power supply 36 is not at its normal condition.

The battery charger module 60 of the battery support system comprises circuitry that provides constant charging to the batteries when in the standby mode of operation. The module 60 further comprises monitoring for and metering circuitry that provide for a analog display of the charging current and the battery string voltages, an indicating lamp display for the overall UPS system conditions status, and interface circuitry between the battery adapter module 58 and the batteries 62.

For the embodiment shown in FIG. 2, there are 48 batteries in each UPS system arranged therein. Each of the batteries are 12 VDC, have a 40 ampere hour rating, and are of the lead acid gel cell type battery. Each of the batteries are recommended to be tested at least four times a year, so as to verify the proper operational status of each battery. The batteries of FIG. 2 are arranged in a manner as shown in Table 3.

TABLE 3

| | BATTERIES | | | | | | | | DC VOLTAGE |
|---|---|---|---|---|---|---|---|---|---|
| UPS SYSTEM #1 | | | | | | | | | |
| Branch #1 | | | | | | | | | |
| String #1 | 1 | 2 | 3 | 4 | 5 | 6 | 7 | 8 | |
| String #2 | 9 | 10 | 11 | 12 | 13 | 14 | 15 | 16 | 200 |
| Branch #2 | | | | | | | | | |
| String #3 | 17 | 18 | 19 | 20 | 21 | 22 | 23 | 24 | |
| String #4 | 25 | 26 | 27 | 28 | 29 | 30 | 31 | 32 | 200 |
| Branch #3 | | | | | | | | | |
| String #5 | 33 | 34 | 35 | 36 | 37 | 38 | 39 | 40 | |
| String #6 | 41 | 42 | 43 | 44 | 45 | 46 | 47 | 48 | 200 |
| UPS SYSTEM #2 | | | | | | | | | |
| Branch #1 | | | | | | | | | |
| String #1 | 1 | 2 | 3 | 4 | 5 | 6 | 7 | 8 | |
| String #2 | 9 | 10 | 11 | 12 | 13 | 14 | 15 | 16 | 200 |
| Branch #2 | | | | | | | | | |
| String #3 | 17 | 18 | 19 | 20 | 21 | 22 | 23 | 24 | |
| String #4 | 25 | 26 | 27 | 28 | 29 | 30 | 31 | 32 | 200 |
| Branch #3 | | | | | | | | | |
| String #5 | 33 | 34 | 35 | 36 | 37 | 38 | 39 | 40 | |
| String #6 | 41 | 42 | 43 | 44 | 45 | 46 | 47 | 48 | 200 |
| UPS SYSTEM #3 | | | | | | | | | |
| Branch #1 | | | | | | | | | |
| String #1 | 1 | 2 | 3 | 4 | 5 | 6 | 7 | 8 | — |
| String #2 | 9 | 10 | 11 | 12 | 13 | 14 | 15 | 16 | 200 |
| Branch #2 | | | | | | | | | |
| String #3 | 17 | 18 | 19 | 20 | 21 | 22 | 23 | 24 | |
| String #4 | 25 | 26 | 27 | 28 | 29 | 30 | 31 | 32 | 200 |
| Branch #3 | | | | | | | | | |
| String #5 | 33 | 34 | 35 | 36 | 37 | 38 | 39 | 40 | |
| String #6 | 41 | 42 | 43 | 44 | 45 | 46 | 47 | 48 | 200 |

As seen in Table 3, each UPS system has 48 batteries, the batteries are separated into three separate branches #1, #2, and #3. Each of the branches have six strings; #1, #2, #3, #4, #5, and #6 with each string having eight batteries. Each of the branches have two battery strings wired in series to provide 200 volts d.c. for each branch. The 48 batteries, when fully charged, provide full power for twenty minutes at a full 18 KVA load and additional minutes with a reduced load capability.

The batteries serve as a back-up for powering the system in the event of loss of a main power source; i.e., the main source supply of 60 $H_z$ 400 V three phase signal, or in the event of a failure in the input stage module 36 of the UPS system itself. The UPS system has provisions; e.g., inverter means and switching means, so that the batteries may be adapted to serve as the backup facility to provide the needed power to the actual loads served by the UPS system. The UPS batteries in cooperation with the control panel of the UPS system also has provisions to allow the batteries to be connected to external dummy loads, to be described, individually or in combined branches. If one 200 volts branch has a major problem (one open battery will cause such as a problem) and the problem is not detected before a loss of input power from the input power supply occurs, the UPS system will not switch over to the battery support system and the power signal 24 will be interrupted until the UPS input power is restored to its normal condition.

This major problem may go undetected, without the benefits of the present invention, because of the inconvenience and difficulty involved in the testing of batteries. It has been prior practice that the batteries are not tested or replaced until a problem is first recognized after a loss of power (60 $H_z$ 400 volts, three phase) to the input of the UPS system, thereby, causing a loss of power at the output of the UPS system. The undetected problem with the batteries eventually could result in hardware damage to the modules of the UPS system or to the actual load connected to the UPS system or even both. This type of damage may be created by transient and inrush currents that may occur during emergency situations, or even during the turning on and off of the equipment itself. The loss of this equipment may, in turn, result in a lengthy down time and a lengthy recalibration of the sensitive equipment serving as the load.

It has been prior practice, that during the failed condition power to the sensitive load would have to be transferred to an alternate power source and this condition would remain until the primary power source (60 $H_z$ 400 V three phase) or UPS input stage has been tested and the failure condition determined. Because of the heavy current associated with such devices and the associated heavy cables for carrying and delivering the heavy current, the hook-up or connection to the load equipment commonly required an excessive amount of time.

Before such testing was initiated, the UPS system would be commonly shut down and its output connected to load banks having 60 $H_z$ and 400 $H_z$ capabilities. After such connection, the UPS system would be reactivated and the testing procedure then initiated. The output developed by the UPS system being a 3-phase arrangement would correspondingly require a 3-phase load arrangement. Sometimes during this testing, the 3-phase load creates an imbalance between the output phase windings of the UPS system which may contribute to erroneous testing results.

All of these problems with the prior practice are avoided or certainly reduced by the practice of the present invention. More particularly, the UPS system of the present invention provides a single phase test power signal 26 that is conveniently selected to the dummy load devices and is generated without the need of any removal of input power (60 Hz, 400 V, three phase). The practice of the present invention may be further described in reference to FIG. 3.

Figure 3:
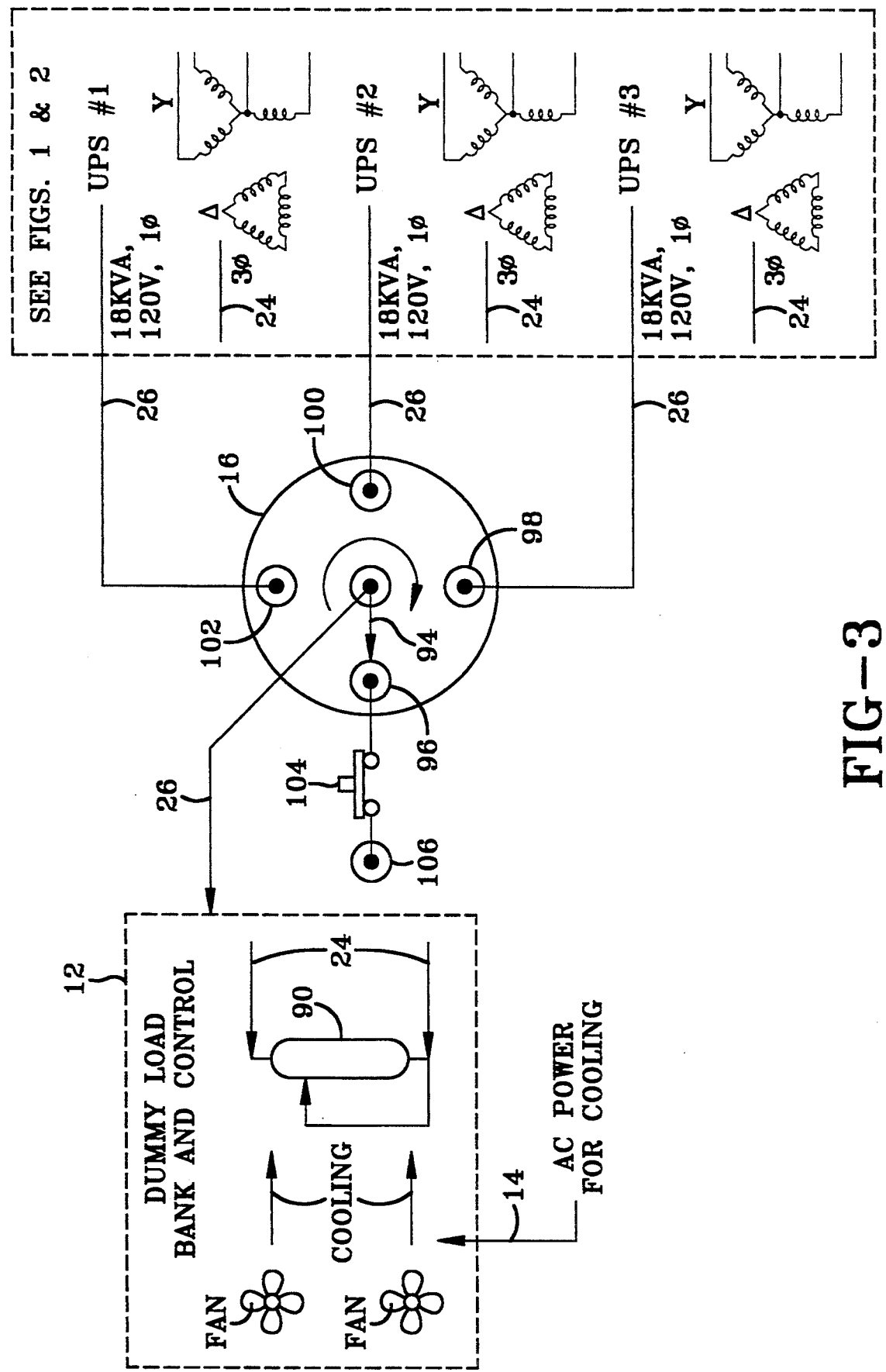
FIG. 3 is a schematic illustrating the switching interconnection between uninterruptible power source (UPS) system and dummy loads both shown in FIG. 1.

FIG. 3 illustrates the primary features of the present invention as comprising at least one UPS system that provides a selectable output power signal 26, a dummy load bank and control arrangement 12 that provides a termination for the selectable single phase output signal, and select switch that interconnects the dummy load to the selectable phase output power signal 26. The circuit arrangement of FIG. 3 is advantageous because it does not require that any of the UPS systems be shut down for testing purposes, but rather allows for any of the UPS systems to easily and safely isolated from the actual load and connected to the dummy load. Furthermore, the selectable capability of the UPS system, in cooperation with its control panel, allows each of the lead acid batteries of any of the UPS systems to be verified by connecting such to the dummy load and, therefore, the reliability of each battery in the UPS system is easily determined. The elimination of the powering down the UPS system, in turn, prevents the possibility of the powering down of and powering up of UPS system from causing any problems to the critical equipment serving as the actual load. It also prevents any damage to the transistor devices of the UPS system that are susceptible to high current transients commonly created by the powering down, powering up of the UPS system. The easily and safely testing of the batteries of the UPS system allows for the detection of any defective battery and, thereby, minimizes the down time previously discussed and normally encountered for such undetectable battery failure conditions. Still further, the UPS system may be verified without the need to apply power to any of the critical equipment serving as the actual loads. Moreover, the switching arrangement of FIG. 3 allows a single dummy load to be connected to a single selectable 120 V single phase output winding, and thereby, avoids the typically experienced three phase unbalanced condition causing erroneous testing results previously discussed.

The dummy load bank and control may typically comprise a resistor or impedance element 90 that typically serves as a 15 kw loading element. The AC power 14 provides the dummy load 90 with the cooling means, such as fans, to allow the heat dissipated by the 15 kw watt dummy load to be carried away from the general region of load. The 15 kw dummy load and control of FIG. 3 commonly includes detection circuits that automatically disconnect the dummy load from the selected signal 26 in the event of a failure of the cooling fan. Still further, the dummy load bank control preferably has both 60 $H_z$ and 400 $H_z$ loading and metering capabilities.

The dummy load selector switch 16 is a four position break-before-make manual bus transfer switch that includes three respective circuit breakers and preferably further includes a safety slide bar assembly that ensures that the selector switch 16, when in its off position, is removed from the AC UPS systems that are not being tested and, thereby eliminates any steady or transient parallelling between any of the UPS systems by way of selector switch 16. Each circuit breaker of the selector switch 16 is connected to an internal bus, and the bus is connected to external studs provided for the connection to the dummy load. The dummy load bank device is hard wired to the external studs of the selector switch 16. The selector switch 16 has a selector arm 94 that carries and switches the relatively heavy currents associated with the 18 kva, 120 V single phase power signal 26 and also, has four positions 96, 98, 100 and 102. The position 96 serves as OFF position and is connected to a slide bar 104 which, in turn, is connected to isolation contact 106. The positions 98, 100 and 102 are respectively hard wired to UPS #3, #2 and #1 and each position is respectively interconnected to the three circuit breakers previously discussed.

To operate the invention, a particular UPS system #1, #2 or #3 is selected to be tested and then that selected system is isolated from its actual load by switching means, such as a manual bus transfer switch. At the same time, the actual load is connected to an alternate power source, such as a AC regulated power source. The selected UPS system is then set, by means of the control panel of UPS system, to its signal phase output mode of operation and the output voltage signal 26 is then adjusted to the desired 120 V AC. The circuit breaker in the selector switch for the particular position selected, 98, 100 or 102, is set to its on position. Then the fans connected to the dummy load are activated. Now the selector switch 16 is moved to either position 98, 100 or 102 so that the power signal 26 from the selected UPS #1, #2, or #3 is routed to the selector switch 16 which, in turn, routes the signal 26 to the dummy load.

All of this testing is accomplished without causing any shut down of the input power to any of the UPS systems. The UPS systems can now be safety load tested by means of load bank system which has both 60 and 400 $H_z$ capability and metering so as to affectively verify the parameters of signal 26 which may be of either a 60 $H_z$ or 400 $H_z$ type. Since a known single dummy load element is used to test any of the three UPS system, comparison data of the amount of power consumed amongst all three UPS system may be obtained. Furthermore, since a single dummy load element is used to test a single phase power signal 26, no loading unbalanced problems, previously discussed, are encountered.

It should now be appreciated that the practice of the present invention provides for an AC uninterruptible power source having a selectable single phase output power signal as well as at least one storage battery. The invention further comprises a dummy load and switching arrangement that easily and safely connects the single phase power output signal to the dummy load for testing purposes. Further, each of the batteries within the UPS system may be easily and conveniently exercised so that no battery failure condition will go unnoticed for any extended amount of time. Still further, the present invention also allows for each of the UPS systems to be tested without the removal of any input power to the UPS system itself. Such non-removal, reduces the problems commonly occurring during high current turn on creating high transients that may otherwise damage sensitive elements such, as transistors in the UPS systems themselves or in the sensitive load equipment which the UPS systems service.

Many modifications or variations of the present invention are possible in view of the above disclosure. It is therefore to be understood, that within the scope of the appending claims, the inventions may be practiced otherwise as specifically described.

Invention claimed is:

1. A system providing load termination for testing purposes, said system comprising:
   at least one AC uninterruptible power source connectable to critical equipment and having at least one battery and having means for both generating a selectable single phase and a three phase power output signal, said three phase power output signal being regulated, filtered and conditioned so as to power said critical equipment;
   a dummy load for only terminating said selectable single phase power output signal; and
   a switching arrangement that interconnects said dummy load to said selectable single phase power output signal.

2. A system according to claim 1, further comprising metering means for measuring the parameters of said single phase power signal.

3. A system according to claim 1, further comprising a control panel provided for operator intervention and a battery charger connected to said at least one battery.

4. The system according to claim 3, wherein said AC uninterruptible power source comprises:
   a linear input power supply for developing a d.c. output and having an input stage which accepts an AC input power;
   a control module connected to said d.c. output and generating analog and control signals in response to requests initiated at said control panel by said operator;
   at least one power module connected to said d.c. output and responsive to said analog and control signals, said at least one power module developing said selectable single phase and three phase power output signals;
   battery support system comprising said battery charger and said at least one battery; and
   a battery adapter module receiving said selectable single phase and said three phase power output signals, said battery adapter module being connected to said battery charger, said battery adapter module having voltage detecting means connected to said input stage of said linear power supply and generating a transfer signal when the voltage level of said AC input power goes below a predetermined value, said battery adapter module having means for switching between said selectable single phase and three phase power output signals and said at least one battery in response to said transfer signal.

5. A system providing load termination for testing purposes, said system comprising:
   at least one AC uninterruptible power source connectable to critical equipment and having at least one battery and having means for generating selectable single phase and three phase power output signals, said three phase power output signals being regulated, filtered and conditioned so as to power said critical equipment;
   a variable dummy load for only terminating said selectable single phase power output signal and having means for cooling said variable dummy load; and
   a switching arrangement that interconnects said dummy load to said selectable single phase power output signal.

6. A system according to claim 5, wherein said switching arrangement comprises a break-before-make manual transfer switch having an OFF position and at least one other position that is interconnected to at least one circuit breaker, said OFF position having a slide bar assembly for isolating its OFF position.

7. A system providing load termination for testing purpose comprising:
   at least one AC uninterruptible power source connectable to critical equipment and having a plurality of batteries and having means for generating a selectable single phase power output signal of about 15 Kw, said means for generating three phase power output signals during the absence of said selectable single phase power signal and being of a power of about 15 Kw, said three phase power output signals being regulated, filtered and conditioned so as to power said critical equipment;
   a dummy load for terminating said selectable single phase power output signal said dummy load having a power rating of 15 Kw; and
   a power bus transfer switch that interconnects said dummy load to said selectable single phase power output signal.

8. The system according to claim 7, wherein said at least one AC uninterruptible power source comprises power generating means for generating said selectable single phase power signal having a frequency of 60 $H_z$, and said three phase power output signal having a frequency of 60 $H_z$ and having a connection selected from one of delta and wye AC power connections.

9. The system according to claim 7, wherein at least one AC uninterruptible power source comprises power generating means for generating said selectable single phase power signal having a frequency of 400 $H_z$ and said three phase power output signals having a frequency of 400 Hz and having a connection selected from one of delta and wye AC power connections.

10. A system according to claim 7, wherein said plurality of batteries comprise 48 lead acid type batteries arranged to provide a power output of about 18 Kw.

11. A system according to claim 7, wherein said respective means for generating said single phase and said three phase power output signals are responsive to signals initiated by an operator at a control panel of said at least one AC uninterruptible power source.

* * * * *